United States Patent
Lopez (10) Patent No.: US 6,323,609 B1
(45) Date of Patent: Nov. 27, 2001

(54) ALTERNATE HIGH-SIDE/LOW-SIDE PWM OPERATION OF BRUSHLESS MOTORS

(75) Inventor: Rafael S. Lopez, Danville, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 08/485,586

(22) Filed: Jun. 7, 1995

(51) Int. Cl.7 .................................................... H02K 23/00
(52) U.S. Cl. .......................... 318/254; 318/138; 318/439; 388/811
(58) Field of Search .................................... 318/254, 138, 318/439, 771; 363/98; 388/811

(56) References Cited

U.S. PATENT DOCUMENTS

| | | | |
|---|---|---|---|
| 3,967,173 | * 6/1976 | Stich | 318/138 |
| 4,841,207 | * 6/1989 | Cheyne | 388/811 |
| 5,202,616 | 4/1993 | Peters et al. | |
| 5,319,289 | 6/1994 | Austin et al. | |
| 5,343,127 | 8/1994 | Maiocchi | |
| 5,530,332 | * 6/1996 | Rees | 318/138 |

OTHER PUBLICATIONS

Pouilloux, "Full Wave Sensorless Drive ICs for Brushless DC Motors", 10 Electronic Components & Applications 2 (1991).

Antognini et al., "Self Synchronisation of PM Step and Brushless Motors; A New Sensorless Approach", in Actuator 90: Proceedings of 2nd International Technology–Transfer Congress at 44 (ed. K. Lenz 1990).

Bahlmann, "A Full–Wave Motor Drive IC Based on the Back–EMF Sensing Principle", 35 IEEE Transactions on Consumer Electronics 415(1989).

Paraskeva et al., "Microprocessor Control of a Brushless DC Motor", in Proceedings of the Conference on Drives/Motors/Controls 84 at 80 (1984).

\* cited by examiner

*Primary Examiner*—Karen Masih
(74) *Attorney, Agent, or Firm*—Lisa K. Jorgenson (57) ABSTRACT

A brushless DC motor system in which PWM current control is performed by chopping the high-side driver during one half of a single cycle, and chopping the low-side driver during one half of a single cycle.

13 Claims, 8 Drawing Sheets

FIG. 1
*(PRIOR ART)*

□ STABLE EQUILIBRIUM POINTS OF PHASE $\overline{AB}$
⊙ UNSTABLE EQUILIBRIUM POINTS OF PHASE $\overline{AB}$

| TIME PERIOD (ELECTRICAL φ) | CONNECTIONS TO: | | |
|---|---|---|---|
| | PHASE A | PHASE B | PHASE C |
| 0-30° | FLOATING | GND | PWM TO VDD |
| 30-60° | PWM TO VDD | GND | FLOATING |
| 60-90° | VDD | PWM TO GND | FLOATING |
| 90-120° | VDD | FLOATING | PWM TO GND |
| 120-150° | PWM TO VDD | FLOATING | GND |
| 150-180° | FLOATING | PWM TO VDD | GND |
| 180-210° | FLOATING | VDD | PWM TO GND |
| 210-240° | PWM TO GND | VDD | FLOATING |
| 240-270° | GND | PWM TO VDD | FLOATING |
| 270-300° | GND | FLOATING | PWM TO VDD |
| 300-330° | PWM TO GND | FLOATING | VDD |
| 330-360° | FLOATING | PWM | VDD |

ALTERNATE HIGH-SIDE/LOW-SIDE PWM OPERATION OF BRUSHLESS MOTORS

BACKGROUND AND SUMMARY OF THE INVENTION

The present invention relates to brushless motor systems.

Recent years have seen great simplification of DC motors, with corresponding benefits in cost and reliability. Historically most DC motors have used brushes to provide current to the correct phase of the rotor windings, and this persists in motors for consumer products; but for products where reliability and lifetime are needed, electronic commutation is now used. By using semiconductor switches (e.g. FETs) to switch current to the appropriate field winding, the need for replacement of brushes, and the attendant ozone generation, production of conductive dust, and potential for sparking, can be avoided.

Initially electronic commutation was usually accomplished by using some other mechanism to sense the physical position of the rotor. The transducers are typically Hall cells mounted at strategic locations in the motor, in order to provide position information for the commutation circuitry. However, the need for these costly components can be eliminated by obtaining motor position information based on the BEMF of the unenergized (floating) winding.

"BEMF," or back electromotive force, is the voltage induced on a winding, by the changing magnetic field which is present inside the motor, when the winding is not being electrically driven by the external driving circuit. The proximity of a rotor pole contributes to the changes in the magnetic field (due to the magnetic field in the rotor), and therefore the BEMF provides some information about the instantaneous position of the rotor. Even though the magnitude of the BEMF is highly dependent on the specific motor architecture (and possibly also on the load conditions), a change in the sign of the BEMF will occur when a rotor pole passes the center of the floating armature coil. Thus detection of zero-crossings in the BEMF can in principle provide adequate information about rotor position.

Many publications have discussed the problems of brushless DC motor control, including e.g. Pouilloux, "Full-wave sensorless drive ICs for brushless DC motors," 10 ELECTRONIC COMPONENTS & APPLICATIONS 2 (1991); Antognini et al., "Self synchronisation of PM step and brushless motors; a new sensorless approach," in ACTUATOR 90: PROCEEDINGS OF 2ND INTERNATIONAL TECHNOLOGY-TRANSFER CONGRESS at 44 (ed. K.Lenz 1990); Bahlmann, "A full-wave motor drive IC based on the back-EMF sensing principle," 35 IEEE TRANSACTIONS ON CONSUMER ELECTRONICS 415 (1989); Paraskeva et al., "Microprocessor control of a brushless DC motor," in PROCEEDINGS OF THE CONFERENCE ON DRIVES/MOTORS/CONTROLS 84 at 80 (1984); U.S. Pat. No. 5,343,127 of Maiocchi, "Start-up Procedure for a Brushless, Sensorless Motor;" U.S. Pat. No. 5,319,289 of Austin et al., "Adaptive Commutation Delay for Multi-pole Brushless DC Motors;" U.S. Pat. No. 5,202,616 of Peters et al., "Bipolar or Unipolar Drive Back-EMF Commutation Sensing Method;" Hanselman, BRUSHLESS PERMANENT-MAGNET MOTOR DESIGN (1994); and T.J.E. Miller, BRUSHLESS PERMANENT-MAGNET AND RELUCTANCE MOTOR DRIVES (1993); all of which are hereby incorporated by reference.

Background: Power Transistor Control Using Pulse Modulation

When a power transistor is used to drive a load which can draw high current (such as a motor winding), the transistor's power dissipation will be high when it is only partially turned on. Thus in such applications the transistors are typically switched on or off (subject to slew rate constraints), but are not operated for any significant duration in an intermediate state. Therefore, when analog control of output current is required, this is commonly synthesized by switching the transistor with a waveform which is then averaged, by a capacitor of acceptable size, to provide the desired analog current waveform.

One of the most common ways to do this is pulse-width modulation (PWM). In pulse-width modulation the duration of each pulse is adjusted to provide the desired average current level; the pulses themselves may occur at a constant frequency, or may be separated by constant durations.

In motor control systems generally, the control logic gets one or more data inputs to determine the velocity of the motor, and accordingly controls transistor switching to apply the correct drive current to the motor windings. The control relation normally seeks to maintain the motor at a predetermined constant speed (or sometimes at a variable speed determined by a command input). In integrated motor control systems, the command outputs from the control logic are typically provided to a PWM circuit, which provides a pulse train with the desired duty cycle to the gate of a power FET (either directly or through additional buffering stages).

Various other pulse modulation schemes have been proposed, involving introduction of techniques such as burst length modulation or frequency modulation. However, the two types of PWM are extremely simple, and are the predominant technique used for motor control.

In order to establish proper commutation during the operation of a multi-phase brushless motor, it is essential to determine the phase of the motor windings. Normally, two windings are driven from phase-to-phase, making the Back EMF (BEMF) available at the floating phase. This BEMF can then be examined to determine the electrical phase. This information can then be used to determine commutation timing, as well as providing a signal representative of the rotation of the motor (Tachometer signal).

A problem arises when the driving signal from phase to phase is Pulse Width Modulated (PWM). The recirculating clamps necessary for providing the current path in PWM are present also at the floating phase. This restricts the floating phase voltage to the power and ground potentials. However, the BEMF voltages present on the motor phases add up in such a way that, during recirculation, the floating phase is driven above or below the positive or negative rails, depending on whether the recirculation clamps are at the positive or negative rail. This results in current flowing through the floating phase. This current is objectionable for at least two reasons: 1) It produces a torque in the direction opposite rotation (Braking), increasing torque ripple and resulting in acoustic noise, and 2) This current flowing through the phase resistance and inductance, adds to the floating phase BEMF, making it impossible to directly measure the BEMF at the floating phase.

This invention eliminates the current in the floating phase during the recirculation time of the other phases.

Summary of Disclosed Innovations

In order to prevent current flowing in the floating phase of the motor during recirculation, the PWM operation is modified from the conventional high or low side chopping, to alternating high and low side depending on the phase angle of the Back EMF of the floating phase. Thus, the high side is chopped during the time the floating leg's Back EMF is positive, and the low side chopped during the time it is negative. The switch between high-side-chopping and low-side-chopping can be made, for example, at the time of zero-crossing (in the voltage on the floating leg), i.e. halfway through the driving phase, or can also be made at any other time before the current rise in the floating leg occurs.

Thus the disclosed inventions avoid excessive power consumption and acoustic noise generation. One advantage of the present invention is that additional PWM circuits are not needed, since one PWM circuit can simply be switched over from pull-up to pulldown. Another advantage is that the number of switching events is not increased, so the electrical noise radiated is not increased.

This invention requires the ability to select whether the low or high leg will be chopped, and this implies some hardware constraint; but otherwise the present invention is highly compatible with existing structures. For example, only one PWM oscillator is necessary, since this oscillator can simply be switched from operating the high side to operating the low side as required.

Note that this innovative operation is applicable to any brushless DC motor, regardless of whether position sensing is used or not.

In theory, the floating-leg current could also be prevented by chopping the high and low sides simultaneously—but this is difficult to implement. However, the present invention is a much simpler solution for which existing hardware can more easily be adapted.

BRIEF DESCRIPTION OF THE DRAWINGS

The disclosed inventions will be described with reference to the accompanying drawings, which show important sample embodiments of the invention and which are incorporated in the specification hereof by reference, wherein:

FIGS. 4B1–4B3 show waveforms expected to occur in the circuit of FIG. 4A when operated according to the prior art.

DETAILED DESCRIPTION OF THE PREFERRED EMBODIMENTS

Figure 1:
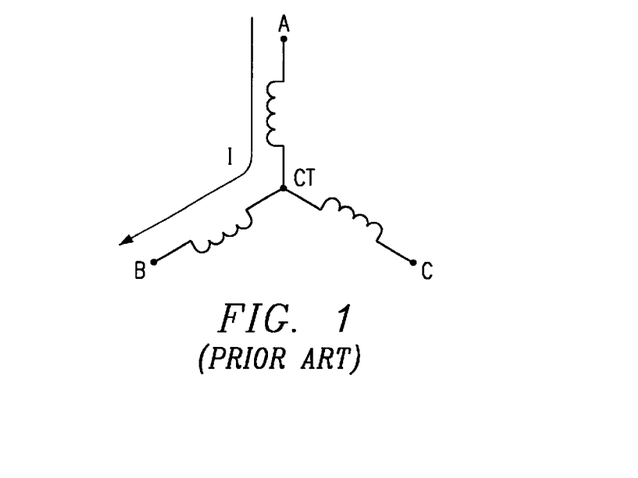
FIGS. 1, 2 and 3 illustrate the operation of a star-configured three phase motor having six distinct phases of excitation.
Figure 2:
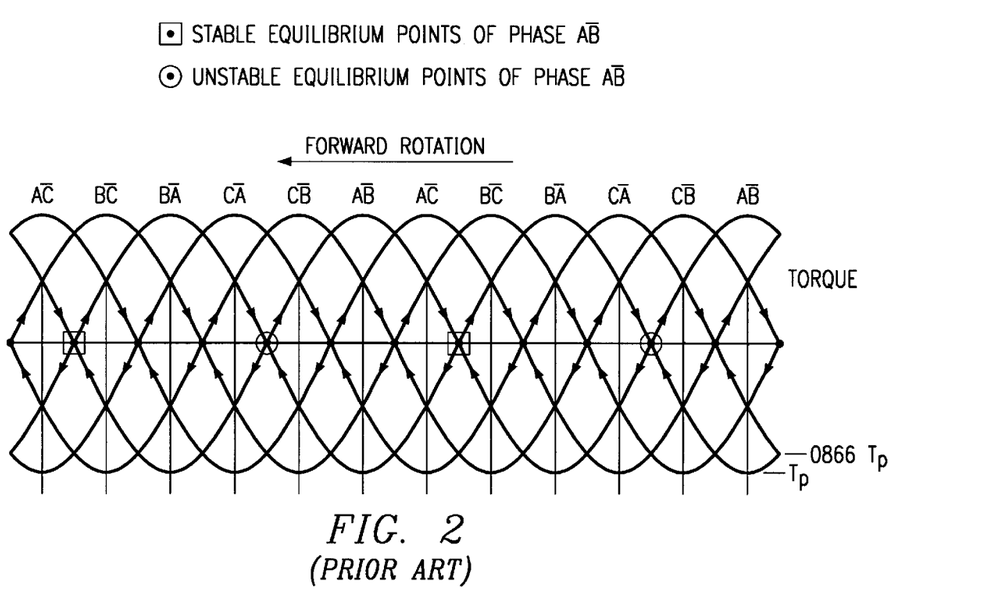
Figure 3:
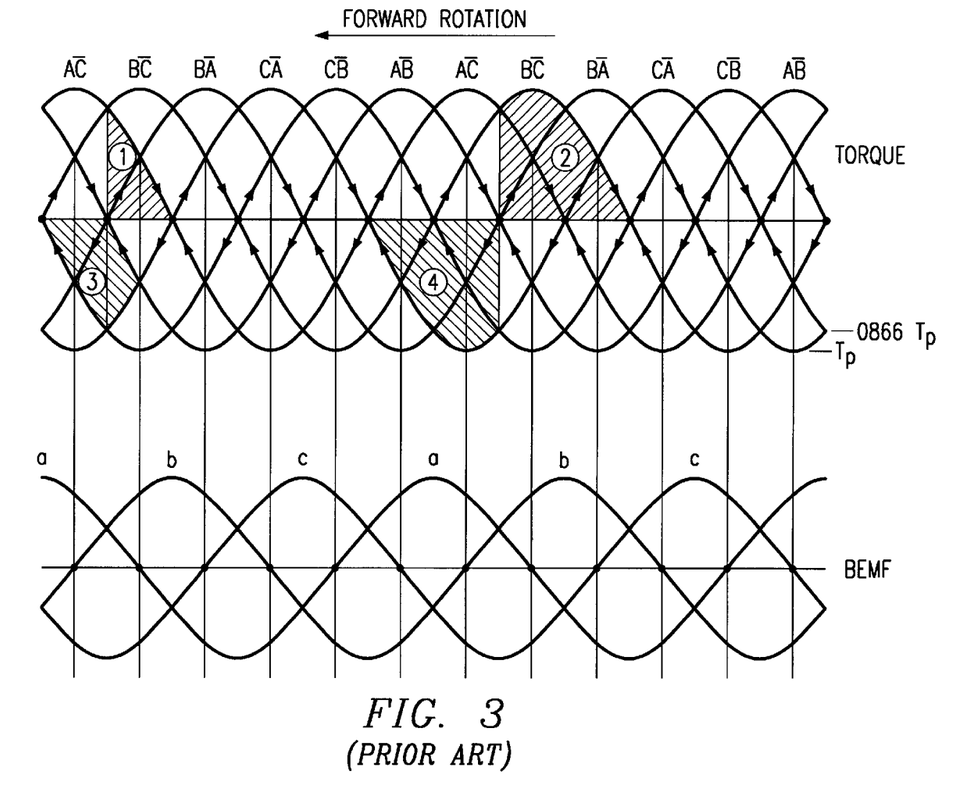

The numerous innovative teachings of the present application will be described with particular reference to the presently preferred embodiment (by way of example, and not of limitation), in which:

FIGS. 1, 2 and 3 illustrate the operation of a star-configured three phase motor having six distinct phases of excitation.

According to the inventions disclosed in the present application, the commutation scheme is modified as described below. However, these figures show the basic commutation sequence which permits motor operation.

Figure 4A:
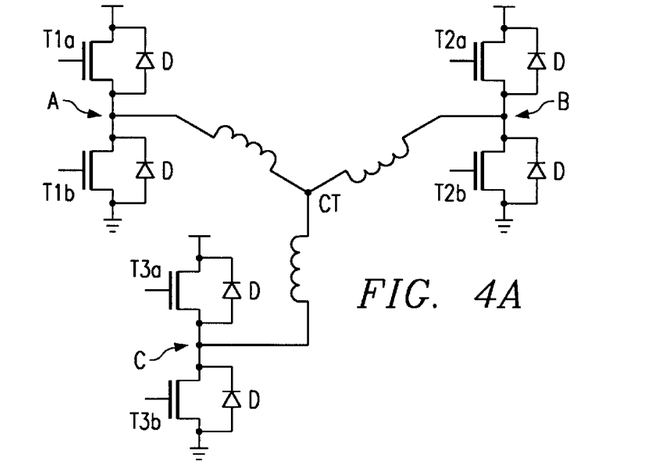
FIG. 4A shows an equivalent circuit of a three-phase motor being driven.

FIG. 4A shows an equivalent circuit of the coil and driver transistors of a three-phase motor being driven by six power transistors. Each of the three stator windings A, B, and C is connected to a pull-up transistor T1a or T2a or T3a and to a pull-down transistor T1b or T2b or T3b. All the transistors are VDMOS transistors, and hence each includes an integral power diode, which prevents the source from rising much above the drain. The integral diodes of each of the transistors are shown as diodes D.

Figure 4B:
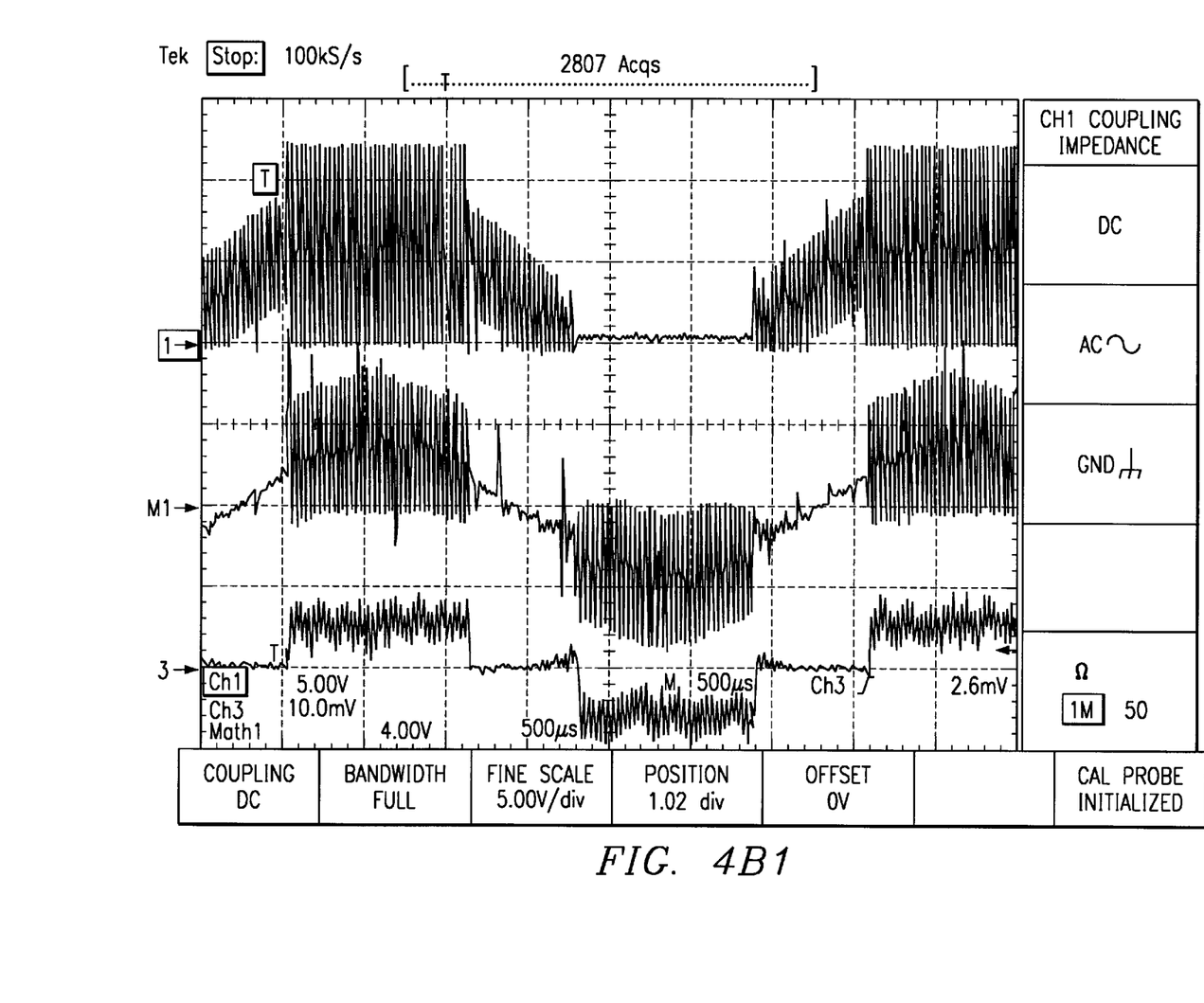
Figure 4B:
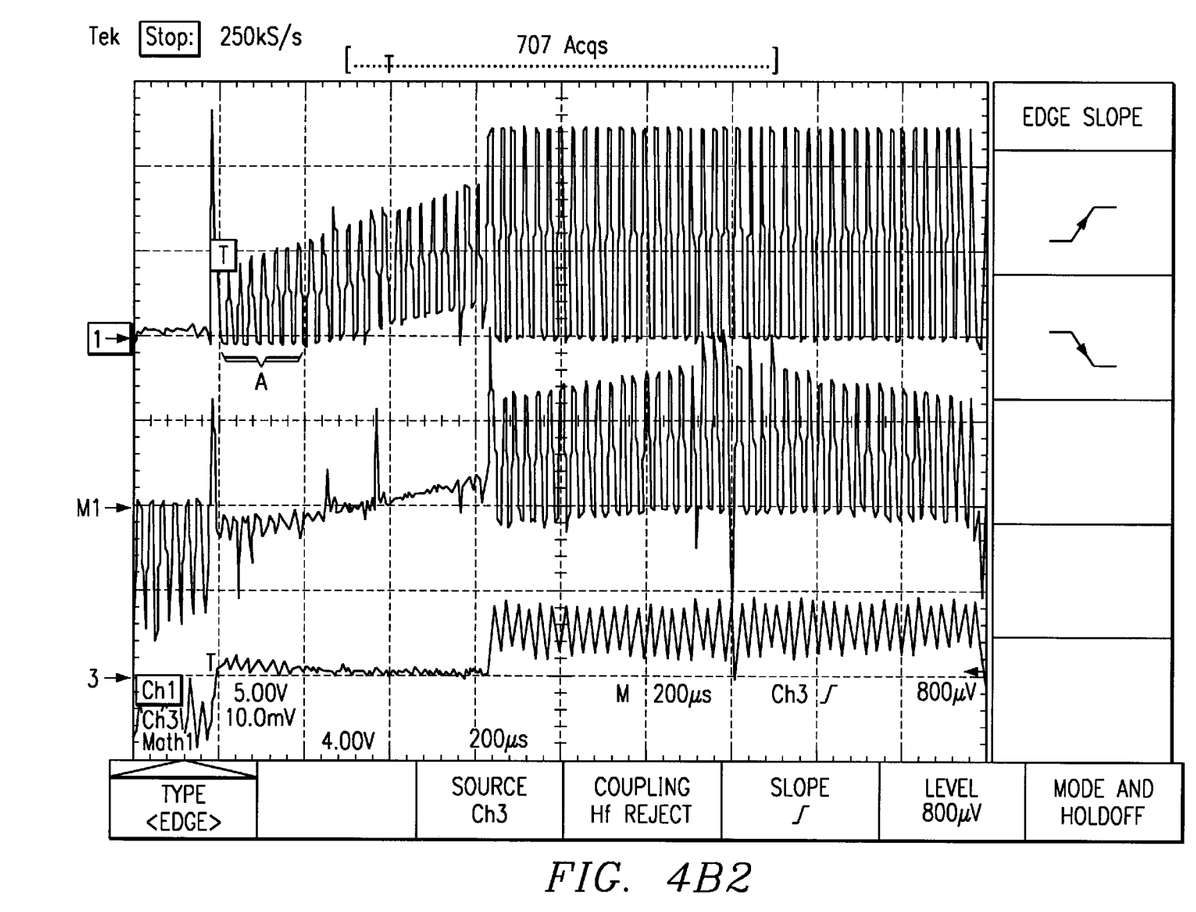
Figure 4B:
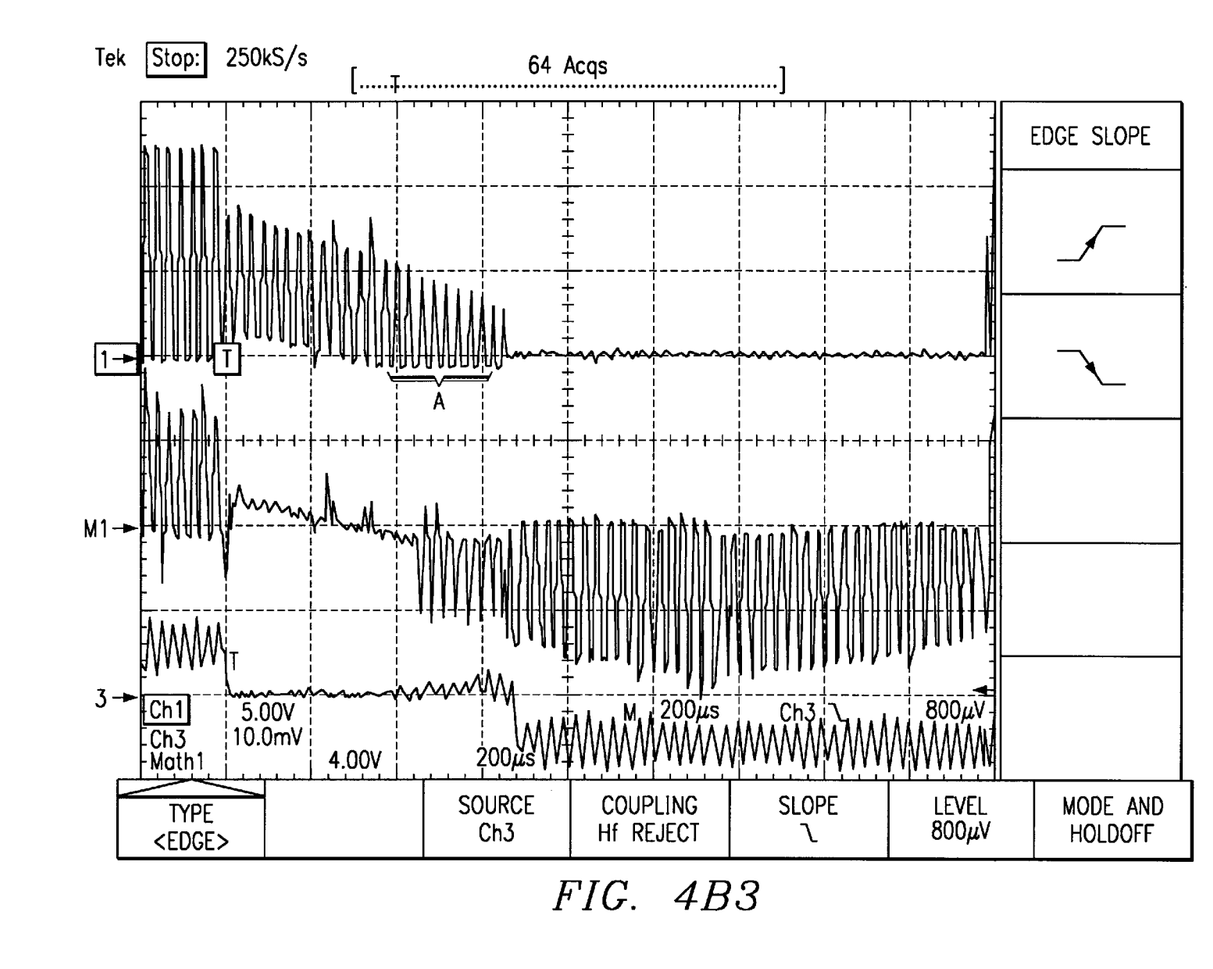
Figure 4C:
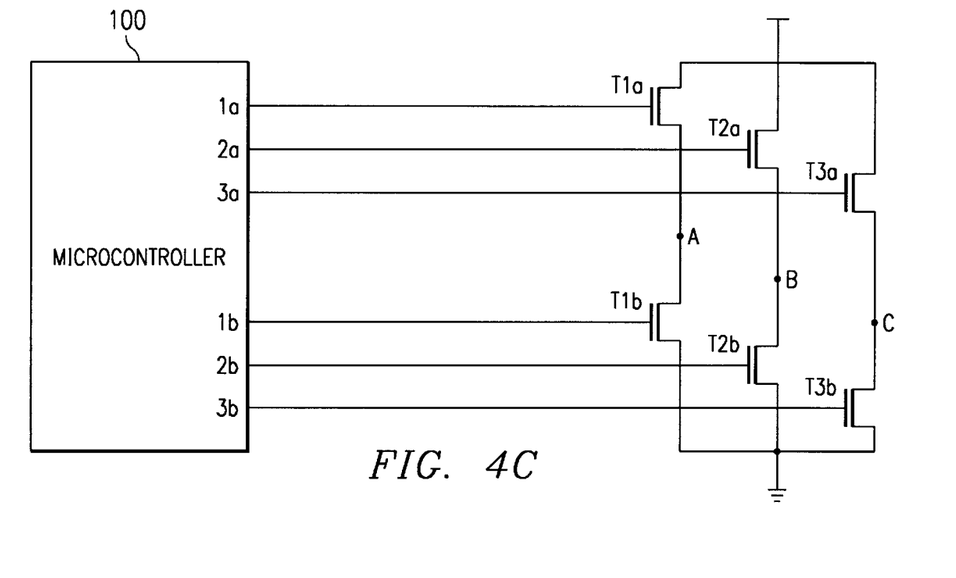
FIG. 4C is a simplified illustration of the circuit of FIG. 4A, further including a microcontroller.

FIG. 4C shows an arrangement substantially like that of FIG. 4A but with a microcontroller 100 that has output terminals 1a, 2a, 3a, 1b, 2b, and 3b connected to apply control signals to the gate electrodes of the respective transistors.

FIGS. 4B1–4B3 show waveforms expected to occur in the circuit of FIG. 4A when operated according to the prior art. In all of these figures:

the top trace shows the voltage on a driven leg;

the center trace shows the voltage between the center tap and the terminal of the floating leg; and the bottom trace shows the current on the floating leg.

Figure 5:
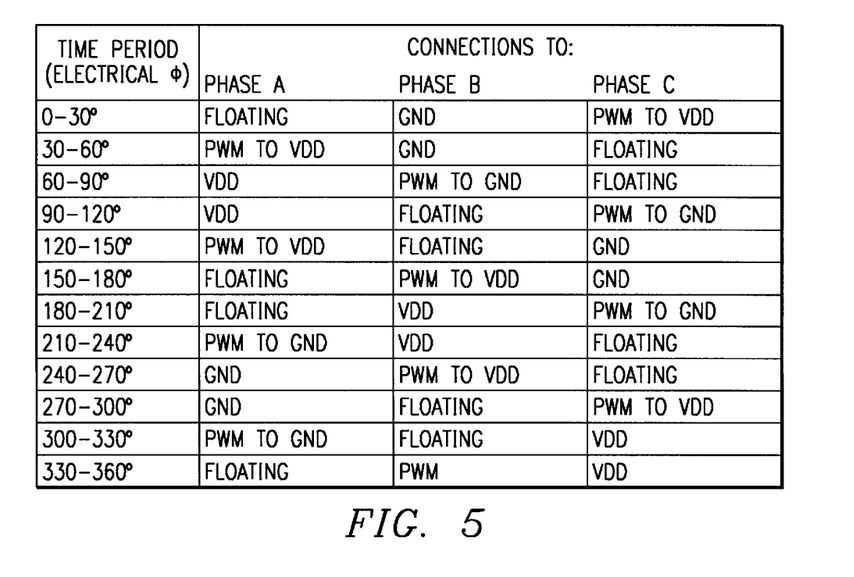
FIG. 5 is a table which shows how the switching transistors are operated according to the present invention.

Note that FIGS. 4B2 and 4B3 cover shorter durations than FIG. 4B1. Periods when clamping is occurring on the floating leg are The table in FIG. 5 shows how the present invention avoids the problems of the prior art. Each single driving phase is split into two parts, and the chopping (under PWM control) is performed, at different times, both on high and on low legs of the driven phase. This avoids generation of a current rise on the floating leg, with consequent power loss as described above.

In the presently preferred embodiment the switch from high-side-chopping to low-side-chopping is made at the time of zero-crossing (in the voltage on the floating leg), i.e. halfway through the driving phase. However, this is not critical: many of the advantages of the present invention can be obtained if the change in chopping polarity is made at any time before the current rise in the floating leg occurs.

Since no current flows through the floating phase during the driven phase recirculation time, the timing for switching between high and low PWM can be easily obtained by comparing the voltage from a center tap to the floating phase (equal to the floating phase BEMF) to zero.

Following is an expanded version of the table of FIG. 5, which indicates how the 12 phases shown are separated by commutation and zero-crossing events:

| | Connections to: | | |
| --- | --- | --- | --- |
| TIME | PHASE A | PHASE B | PHASE C |
| 0–30° | Floating | GND<br>Commutation | PWM to VDD |
| 30–60° | PWM to VDD | GND<br>Zero-Crossing | Floating |
| 60–90° | VDD | PWM to GND<br>Commutation | Floating |
| 90–120° | VDD | Floating<br>Zero-Crossing | PWM to GND |
| 120–150° | PWM to VDD | Floating<br>Commutation | GND |
| 150–180° | Floating | PWM to VDD | GND |

-continued

| TIME | Connections to: | | |
|---|---|---|---|
| | PHASE A | PHASE B | PHASE C |
| | | Zero-Crossing | |
| 180–210° | Floating | VDD | PWM to GND |
| | | Commutation | |
| 210–240° | PWM to GND | VDD | Floating |
| | | Zero-Crossing | |
| 240–270° | GND | PWM to VDD | Floating |
| | | Commutation | |
| 270–300° | GND | Floating | PWM to VDD |
| | | Zero-Crossing | |
| 300–330° | PWM to GND | Floating | VDD |
| | | Commutation | |
| 330–360° | Floating | PWM | VDD |

In addition, a zero-crossing occurs at 0°, i.e. between the 330–360° period and the 0–30° period.

Figure 6:
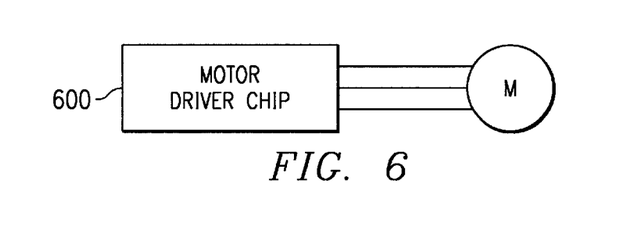
FIG. 6 schematically shows a complete system, which includes a motor driver chip which implements the above-described switching operation, and which is directly connected to drive a small motor.

FIG. 6 schematically shows a complete system, which includes a motor driver chip 600 which implements the above-described switching operation, and which is directly connected to drive a small motor m.

Figure 8:
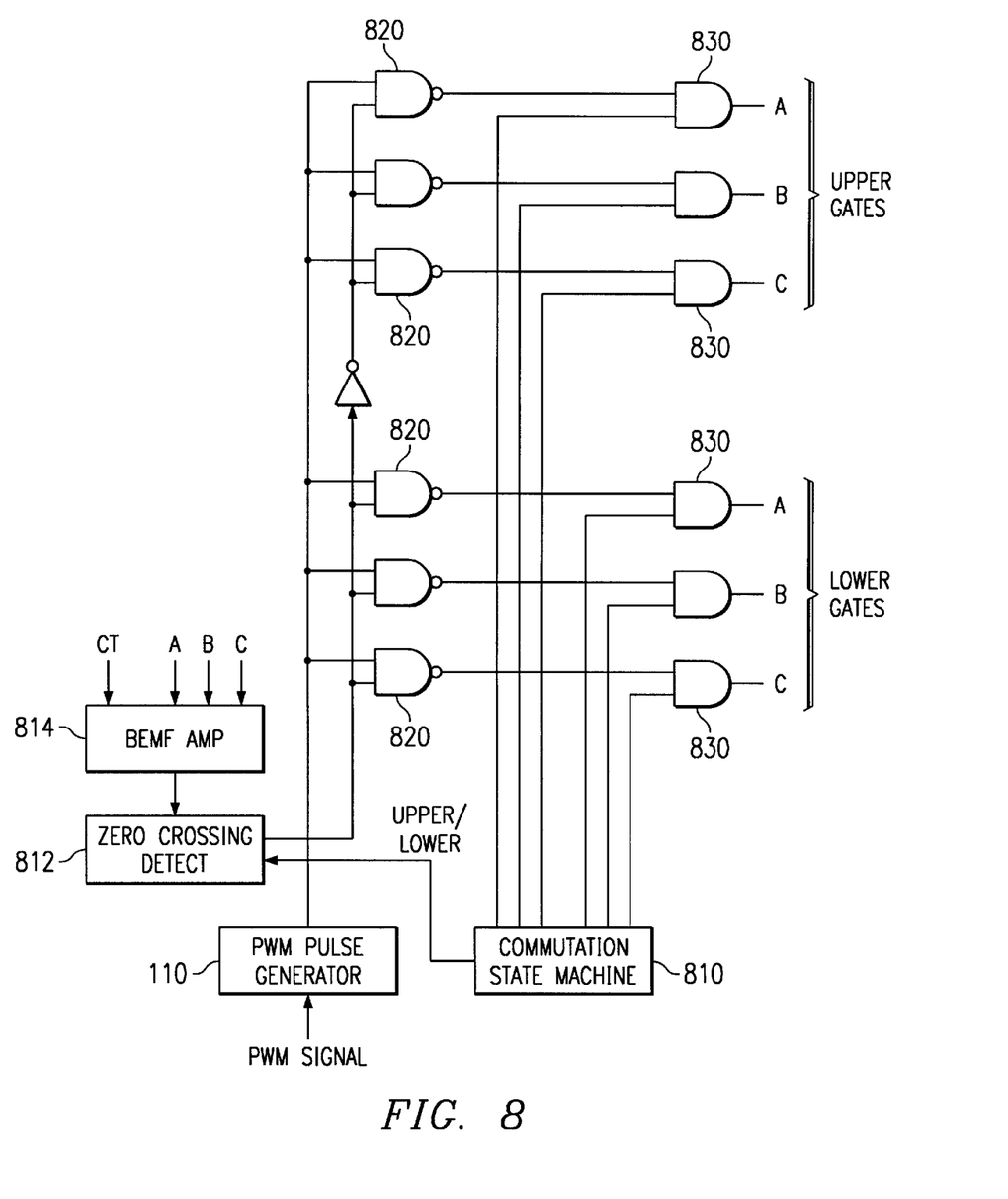
FIG. 8 is a schematic showing a sample circuit used to implement relations like those shown in FIG. 5.

FIG. 8 shows a sample circuit implementation used to implement relations like those shown in FIG. 5. The commutation state machine 810 cycles through the six phases (in this embodiment), driving two lines, in each phase A, B, and C to select one of the upper gates of pull-up transistors T1*a*/T2*a*/T3*a* (shown in FIG. 4A) and one of the lower gates pull-down transistors T1*b*/T2*b*/T3*b* (shown in FIG. 4A). The PWM oscillator or pulse generator 110 provides a pulse train output when activated, and NAND gates 820 route this pulse train either to the pull-up transistors T1*a*/T2*a*/T3*a* or else to the pull-down transistors T1*b*/T2*b*/T3*b*. The commutation state machine 810 also drives an upper/lower selection line, which is gated by the zero-crossing detector 812 (which senses transitions in the voltages sensed by BEMF amp 814). The transitions seen by the zero-crossing detector 812 therefore cause the shift from high-side-chopping to low-side chopping which are seen, for example, at 60°, 120°, 180°, 240°, etc., in the table of FIG. 5. A set of AND gates 830 passes through a selection signal from the state machine 810, unless the corresponding one of the NAND gates 820 is passing a chopping signal, in which case the corresponding one of the six output lines will be chopped. This produces a sequence like that seen in FIG. 5.

Figure 7:
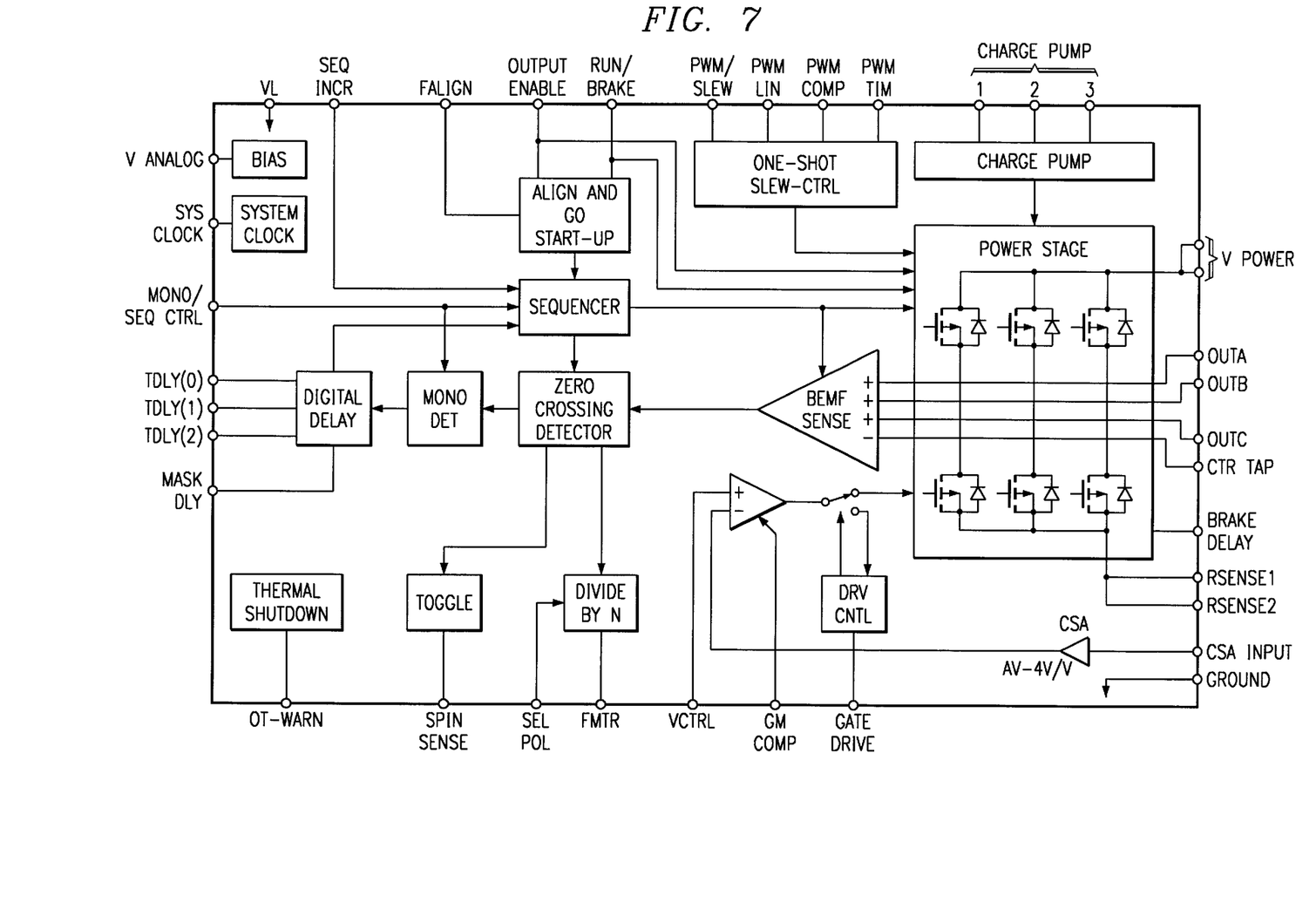
FIG. 7 is a block diagram of a sample integrated circuit motor driver which is capable of operation like that shown in FIG. 5.

FIG. 7 is a block diagram of a sample integrated circuit motor driver into which the circuitry of FIG. 8 can be inserted. In this chip the DRV CNTL can be modified, using circuitry like that of FIG. 8, to produce operation like that of FIG. 5.

According to a disclosed class of innovative embodiments, there is provided: A method for driving a brushless motor having at least first, second, and third terminals, comprising the steps of: a) during a first phase i) operatively connecting said first terminal to a first supply voltage, and ii) operatively connecting said second terminal to a second supply voltage, and iii) disconnecting said third terminal of the motor from said first and second supply voltages; iv) wherein, during one moiety or past of said first phase, said connecting step (i) is chopped, and said connecting step (ii.) is continuous; b) and repeating said step a) with different connections to provide successive commutation phases.

According to another disclosed class of innovative embodiments, there is provided: A method for driving a brushless motor having at least first, second, and third terminals, comprising the steps of: a) in a first phase: continuously connecting said first terminal to a first supply voltage and interruptedly connecting said second terminal to a second supply voltage, and thereafter interruptedly connecting said first terminal to said first supply voltage, and continuously connecting said second terminal to said second supply voltage; and thereafter b) in a second phase, operatively connecting said first and third terminals to said first and second voltages respectively; c) in a third phase, operatively connecting said second and third terminals to said first and second voltages respectively; d) in a fourth phase, operatively connecting said second and first terminals to said first and second voltages respectively; e) in a fifth phase, operatively connecting said third and first terminals to said first and second voltages respectively; f) in a sixth phase, operatively connecting said third and second terminals to said first and second voltages respectively.

According to another disclosed class of innovative embodiments, there is provided: A method for driving a brushless motor which has first, second, and third eye-connected terminals, using a respective pull-up transistor and a respective pulldown transistor connected to each said terminal, said transistors comprising respective clamping diodes, comprising the steps of: a) during one part of a first commutation phase, turning on said first pull-up transistor while chopping current with said second pulldown transistor; and during another part of said first commutation phase, turning on said first pull-down transistor while chopping current with said second pull-up transistor; b) and repeating said step (a.) with different connections to provide successive commutation phases; whereby the combination of said chopping operations in step (a.) provides reduced current dissipation through at least one said clamping diode.

According to another disclosed class of innovative embodiments, there is provided: A motor control integrated circuit, comprising: means for, in a first phase, continuously connecting said first terminal to a first supply voltage and interruptedly connecting said second terminal to a second supply voltage, and thereafter interruptedly connecting said first terminal to said first supply voltage, and continuously connecting said second terminal to said second supply voltage; means for thereafter, in a second phase, operatively connecting said first and third terminals to said first and second voltages respectively; means for, in a third phase, operatively connecting said second and third terminals to said first and second voltages respectively; means for, in a fourth phase, operatively connecting said second and first terminals to said first and second voltages respectively; means for, in a fifth phase, operatively connecting said third and first terminals to said first and second voltages respectively; and means for, in a sixth phase, operatively connecting said third and second terminals to said first and second voltages respectively.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, as will be obvious to those of ordinary skill in the art, other circuit elements can be added to, or substituted into, the specific circuit topologies shown.

For another example, the disclosed inventions are not limited to sensorless motors, but can also (alternatively and less preferably) be applied to motors which also include position sensing.

For another example, it is alternatively possible to divide each commutation phase into more than two parts. (For example, the periods of chopped pull-up can be allowed to overlap with the periods of chopped pull-down; or two periods of chopped pull-up can be combined with one or two or more periods of chopped pull-down.)

For another example, the pull-up transistors can optionally be P-channel devices of some sort, rather than the N-channel VDMOS devices preferably used.

For another example, the motor may also have additional terminals which are connected analogously to the first through third terminals.

For another example the disclosed innovations can optionally be combined with various other features of motor control, e.g. with temporary suspension of PWM chopping during zero crossing as described in commondy owned application Ser. No. 08/486,314 of Carobolante and Lopez, filed simultaneously herewith, now abandoned, of which Ser. No. 08/772,383, filed Dec. 23, 1996, is a continuation.

What is claimed is:

1. A method for driving a brushless motor having at least first, second, and third terminals, comprising the steps of:
   (a.) during a first phase
      (i.) operatively connecting said first terminal to a first supply voltage, and
      (ii.) operatively connecting said second terminal to a second supply voltage, and
      (iii.) disconnecting said third terminal of the motor from said first and second supply voltages;
      (iv.) wherein, during one part II of said first phase, said connecting step (i.) is chopped, and said connecting step (ii.) is continuous;
   (b.) and repeating said step (a.) with different connections to provide successive commutation phases.

2. The method of claim 1, wherein said motor has only three said terminals.

3. A method for driving a brushless motor having at least first, second, and third terminals, comprising the steps of:
   (a.) in a first phase: continuously connecting said first terminal to a first supply voltage and interruptedly connecting said second terminal to a second supply voltage, and thereafter interruptedly connecting said first terminal to said first supply voltage, and continuously connecting said second terminal to said second supply voltage; and thereafter
   (b.) in a second phase, operatively connecting said first and third terminals to said first and second voltages respectively;
   (c.) in a third phase, operatively connecting said second and third terminals to said first and second voltages respectively;
   (d.) in a fourth phase, operatively connecting said second and first terminals to said first and second voltages respectively;
   (e.) in a fifth phase, operatively connecting said third and first terminals to said first and second voltages respectively;
   (f.) in a sixth phase, operatively connecting said third and second terminals to said first and second voltages respectively.

4. The method of claim 3, wherein each said interruptedly connecting step uses N-channel field-effect transistors.

5. The method of claim 3, wherein said motor has only three said terminals.

6. A method for driving a brushless motor which has first, second, and third wye-connected terminals, using a respective pull-up transistor and a respective pull-down transistor connected to each said terminal, said transistors comprising respective clamping diodes, comprising the steps of:
   (a.) during one part of a first commutation phase, turning on said first pull-up transistor while chopping current with said second pull-down transistor; and during another part of said first commutation phase, turning on said second pull-down transistor while chopping current with said first pull-up transistor;
   (b.) and repeating said step (a.) with different respective pull-up and pull-down transistors to provide successive commutation phases;
      whereby the combination of said chopping operations in step (a.) provides reduced current dissipation through at least one said clamping diode.

7. The method of claim 6, wherein said transistors are both N-channel field-effect transistors.

8. The method of claim 6, wherein said motor has only three said terminals.

9. A motor control integrated circuit, for a motor having at least first, second, and third terminals, comprising:
   means for, in a first phase, continuously connecting said first terminal to a first supply voltage and interruptedly connecting said second terminal to a second supply voltage, and thereafter interruptedly connecting said first terminal to said first supply voltage, and continuously connecting said second terminal to said second supply voltage;
   means for thereafter, in a second phase, operatively connecting said first and third terminals to said first and second voltages respectively;
   means for, in a third phase, operatively connecting said second and third terminals to said first and second voltages respectively;
   means for, in a fourth phase, operatively connecting said second and first terminals to said first and second voltages respectively;
   means for, in a fifth phase, operatively connecting said third and first terminals to said first and second voltages respectively; and
   means for, in a sixth phase, operatively connecting said third and second terminals to said first and second voltages respectively.

10. A brushless motor system comprising:
    a motor with first, second and third windings, having respective first, second an third terminals;
    a plurality of transistor switches including a pair connected with each of said terminals, one of each of the pairs of transistor switches being connected to provide a controllable circuit path between a respective terminal and a first, high, voltage and another of each of the pairs of transistor switches connected to provide a controllable circuit path between a respective terminal and a second, low, voltage, each of the plurality of transistor switches characterized by having a diode integral therewith and effectively connected in parallel to the controllable circuit path thereof;
    commutation apparatus arranged to supply power to the windings in a sequence in which, for a given time period, the first and second of the windings and their respective terminals are in circuit between the high and low voltages while the third winding and the third terminal are at a floating potential, said commutation apparatus characterized by including apparatus for pulsed operation of predetermined ones of said plurality of transistor switches, and further characterized by the pulsed operation being applied for a first part of the given time period to the transistors associated with the first of the windings while continuous operation is applied to the transistors associated with the second of the windings and the pulsed operation being applied for a second part of the given time period to the transistors associated with the second of the windings while continuous operation is applied to the transistors associated with the first of the windings.

11. The system of claim 10 wherein:

the commutation apparatus includes a PWM pulse generator for the pulsed operation; and the commutation apparatus further includes a back EMF amplifier and a zero crossing detector that is responsive to a zero crossing of back EMF in the winding at floating potential to shift from the pulsed operation applied for the first part of the given time period to the pulsed operation applied for the second part of the given time period.

12. A method of operating a brushless motor system having first, second and third windings and each winding having a respective terminal, with each terminal having a pair of transistor switches connected thereto, one of each pair connected between the terminal and a first, high, voltage and the other of each pair connected between the terminal and a second, low, voltage, and with each of the transistors having a diode integral therewith and effectively connected in parallel thereto, the steps comprising:

supplying power to the windings in a sequence in which, for a given time period, there is connecting of the first and second of the windings and their respective terminals in circuit between the high and low voltages while maintaining the third winding at a floating potential, wherein the supplying of power is performed by operating in pulse width modulation (PWM) predetermined ones of the transistor switches in a manner to prevent current flowing in the winding that is at a floating potential during recirculation of current through the diodes integral with said plurality of transistors, wherein the operating in PWM is performed by:

(a.) applying PWM operation for a first part of the given time period to the transistors associated with the first of the windings while applying continuous operation to the transistor associated with the second of the windings, and (b.) applying PWM operation for a second part of the given time period to the transistors associated with the second of the windings while applying continuous operation to the transistors associated with the first of the windings.

13. The method of claim 12 wherein:

the applying of PWM operation is performed with a transition between the first part of the given time period to the second part of the given time period when a zero crossing of the back EMF of the floating potential in the third winding occurs.

* * * * *